Jan. 3, 1967    H. L. NAIMER    3,295,871
JOINT FOR ENSURING THE RELATIVE IMMOVABILITY
OF PARTS PRESSED TOGETHER
Filed July 16, 1963
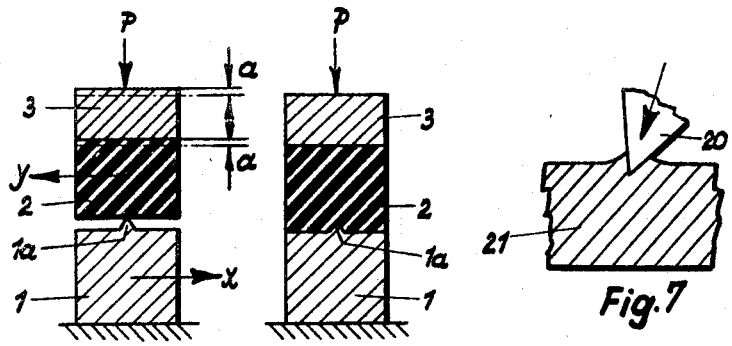
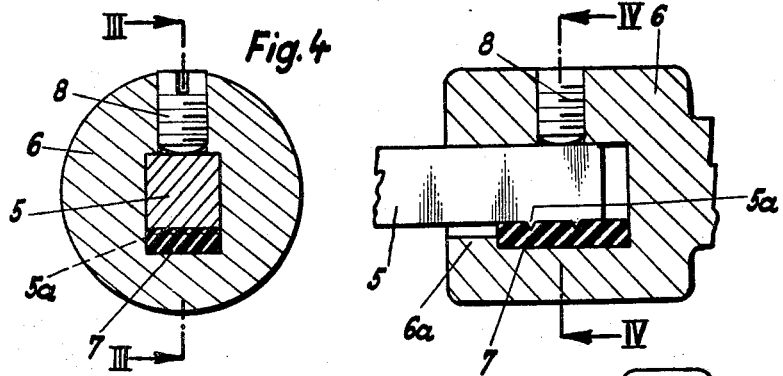
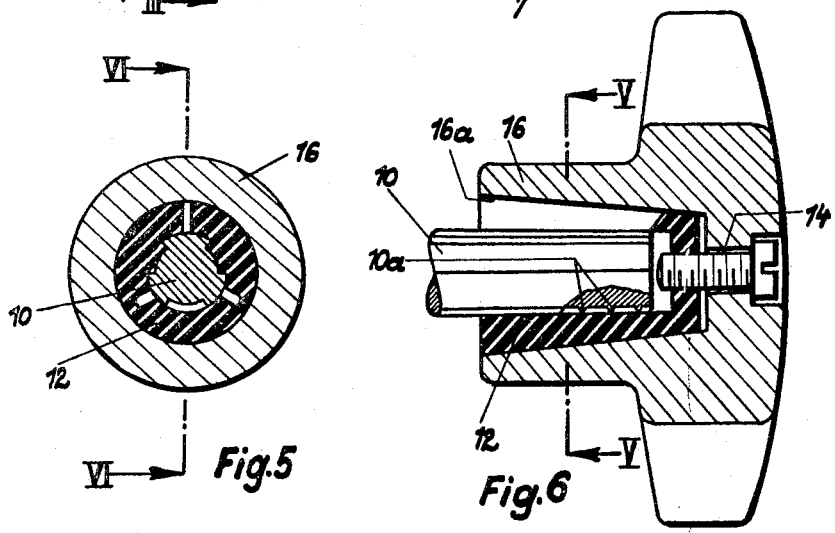
Inventor: HUBERT L. NAIMER
by
Karl G. Ross
AGENT

United States Patent Office 3,295,871
Patented Jan. 3, 1967

3,295,871
JOINT FOR ENSURING THE RELATIVE IMMOVABILITY OF PARTS PRESSED TOGETHER
Hubert L. Naimer, Schumanngasse 35,
Vienna, Austria
Filed July 16, 1963, Ser. No. 295,449
Claims priority, application Austria, July 23, 1962,
A 5,951/62
1 Claim. (Cl. 287—53)

The present invention relates to a device for ensuring the relative immobility of parts pressed together, specifically in cases involving the permanent interconnection by friction between a part of limited stability made from synthetic material and a part of higher stability which may be made from metal.

In connection with the present invention the term "stability" is to be understood as meaning the behavior of a material subjected to continuous pressure. It is known that many materials, especially thermo-plastic synthetic materials such for example as super-polyamides which are becoming increasingly important as technical construction materials, have the property that when they are subjected to continuous pressure they yield to this pressure with deformation of their external shape, i.e. they "flow" or "creep." This "flow deformation" is permanent for many materials, e.g. zinc, but for many others (e.g. super-polyamide synthetic substances) it is not permanent, inasmuch as after cessation of the deforming pressure materials of the last mentioned type assume their original shape again to a large extent if not completely. Thus there is the difference as compared with elastic deformation that the change in shape takes place slowly in a flowing or creeping manner and after cessation of the pressure disappears not at all, or only partially and slowly. "Slowly" means that between the application or removal of the force causing flow and the attainment of the final deformed condition a considerable period of time elapses (the absolute magnitude of which is dependent on the material). The difference as compared with truly permanent change of shape is not only that flow deformation is retarded and takes place slowly but principally that it can be caused by relatively small forces; this type of deformation may also be distinguished from elastic deformation.

The fact that many materials have the property of flowing is a disturbing factor in those technical uses of these materials in which two construction members, one of which consists of material capable of flow, are to be secured relatively to one another by friction. In this case the initial firm connection can slacken under the influence of the flow deformation of that one part. The following examples will make this clearer.

In the construction of electrical apparatus an important part is played by mechanical but frictional connection between a metal part and a part of synthetic material, which may in particular be made from super-polyamide. Such connections are present for example in the fixing of wheels, handles and the like on the shafts of rotary switches in which case the knob, hand wheel or the like needs to be connected to a bushing of synthetic material press-fitted onto the end of the shaft. Another example is the formation of a connection between two ends of shafts with bushings of synthetic material engaging them frictionally, the fixing of power-transmitting wheels on shafts and the like, all against axial removal of one part from the other. In the cases that are of interest in the present connection the power-transmitting part of synthetic material is subjected to pressure at right angles to the direction of assembly of the parts to be connected so that it engages with pressure around a metal part. If now the part of synthetic material under pressure begins to flow, the initially applied pressure decreases, and if this pressure determines the firmness of the connection then the connection can become released, for example if a pull in the axial direction is exerted on the initially firmly secured handle of a switch shaft. In such cases the connection would have to be tightened again, which is generally inconvenient and provides no permanent security against subsequent loosening.

The present invention provides a very simple device for ensuring the relative immobility of two parts pressed together, one of which is made from a synthetic material of limited stability while the other consists of a material of relatively high stability, especially metal. In accordance with the invention, in a contact surface of these parts which is under pressure and which extends in the direction in which separation is to be prevented (referred to hereinafter as the separation direction), at least one rib is provided in the surface of stable material, this rib extending at right angles to the separation direction and having dimensions such that under flow deformation of the part made from material of limited stability it penetrates into the latter. Use is thus made of the fact that under the application pressure initially applied to the system of cooperating parts a now desirable deformation of the material capable of flow occurs along this transverse rib, the plastically deformable material engaging around the rib extending transversely to the separation direction and thereby converting the original frictional connection into a positive connection due to interlocking of the parts.

The principle underlying the invention and some embodiments thereof will now be described with reference to the accompanying drawing, in which:

FIGS. 1 and 2 serve to explain the principles underlying the invention;

FIGS. 3 and 4 show an embodiment of the invention in longitudinal and transverse section, taken respectively on the section lines III—III (FIG. 4) and IV—IV (FIG. 3);

FIGS. 5 and 6 show another embodiment of the invention, also in longitudinal and transverse section taken respectively on the section lines V—V (FIG. 6) and VI—VI (FIG. 5); and FIG. 7 shows a detail.

FIGS. 1 and 2 show the connection of two parts, one of which consists of a flowable material, before and after the occurrence of flow deformation. Reference numeral 1 indicates a metal part against the projecting rib 1a of which a part 2 of a relatively hard material capable of flowing, e.g. a thermo-plastic substance such as super-polyamide, is pressed by means of a pressure-distributing application member 3, the applied pressure P being produced for example by means of a screw. After assembly has been completed and a normal mounting pressure has been applied, the parts take up the position shown in FIG. 1 and it will be appreciated that resistance to displacement in the direction $x$, $y$ is not high and depends primarily on the frictional resistance between the parts 1 and 2. After some time the rib 1a has penetrated into the plastically deformable material 2 so that the latter engages this rib on both sides as can be seen from FIG. 2, the part 2 moving downwardly by the further small increment of distance $a$.

Were the rib 1a not provided, then the parts 1 and 2 would initially be in contact at a certain pressure which at first would suffice to secure the parts against relative movement in the direction $x, y$. However, in practice the part 2 is never fully applied so as to bear tightly at all points. The result is that the part 2 is capable of deforming in some manner, its material migrating towards those regions in which there is no or only slight contact pressure with consequent lowering of the application pressure in those regions in which such pressure is essential for the required relative immobilization of the parts 1 and 2. If however, in accordance with the invention, this drop in pressure is replaced by positive mutual anchoring of the parts 1 and 2, the interconnection in the direction $x, y$ is fully maintained even if the pressure initially applied between these parts is no longer present.

It is an important and distinctive feature of the present invention that this decisive deformation is possible with the exertion of forces that can be expected to be available in the technical fields that are of interest, in particular the above-mentioned cases of hand-actuated rotary members, coupling elements and the like, without any necessity for making these parts of stronger construction than otherwise required. This is a difference in principle as compared with the known use of friction-increasing corrugations, grooves and sharp edges that are employed between metal parts to ensure that they hold together by friction. The forces that are necessary to enable such grooves or the like to be effective without making use of a flow effect could not be used in connection with apparatus of the type that is here in question (electrical apparatus, sensitive mechanical apparatus, etc.). A further difference as compared with these known corrugations or the like is that the number of ribs to be employed and their spacing from one another is determined by the fact that their action results from flow, i.e. relatively few ribs are employed and these are arranged at a corresponding distance apart. With a coupling embodying my present invention, a single rib would suffice in most instances and the provision of a greater number of ribs may be desirable mainly for the reason that a certain play may be required in the relative position of the parts to be connected, which from an economical viewpoint is generally decisive as regards the choice of a frictional type of connection.

The embodiment of the invention shown in FIGS. 3 and 4 is directed to solving the problem of connecting the square end 5 of a shaft to another part 6 which may consist of metal or synthetic material and may be a coupling member. The end of the shaft is provided with transverse ribs 5a which press under the action of a set screw 8 against an insert 7 consisting of a material capable of flowing, which again may be a super-polyamide. It is apparent that, after deformation of the insert 7, the parts 5 and 6 are firmly connected to one another against axial displacement, since part 7 is also prevented by a projection 6a from being removed from the part 6.

In the embodiment shown in FIGS. 5 and 6 there is used a profiled spindle 10 on which is mounted a slotted bushing 12 of synthetic material provided with an external conical surface. The bushing 12 can be drawn, by means of a screw 14 mounted in a knob 16 to be fixed on the spindle 10, into the interior of the knob and into engagement with its conical inner surface 16a. This construction is known per se. The transverse ribs 10a provided in accordance with the invention appear in this case only at the base of the lowermost longitudinal groove of shaft 10 as seen in the drawing, and the correspondingly profiled bushing 12 (which is longitudinally slotted to facilitate deformation) becomes firmly connected to the ribs 10a in the region of this groove by flow of material, so that the knob 16 is fully secured against being pulled away axially.

The several embodiments described above have in common that a substantially nondeformable first part 1, 5 or 10 is joined to a creepingly deformable second part 2, 7 or 12 of mating configuration, the first part having a contact surface provided with a formation 1a, 5a or 10a which defines a shoulder extending transversely to a direction of separation, such as the direction $x, y$ of FIG. 1 which is also the direction in which the parts are originally moved in the interfitting relationship although, of course, the sense of such movement may be opposite the sense of the separation which is to be prevented. In the arrangement of FIGS. 1 and 2 pressure is then exerted, as indicated at P, in a direction which is perpendicular to a plane defined by the separation direction $x, y$ and the transverse formation or rib 1a; in an analogous manner, screw 8 or 14 tends to displace the coupling member 7 or 12 radially toward the metallic element 5 or 10, thus in a direction perpendicular to a plane which is defined by the ribs 5a or 10a and by the longitudinal dimension of the shaft 5 or 10 constituting the direction of separation. In the system of FIGS. 5 and 6, more particularly, this radial pressure is due to the wedging effect of frustoconical surface 16a which results from the axial force exerted by the screw 14 in drawing the coupling member 12 more deeply into the recess of body 16.

It will be understood that so far as the choice of flowable material is concerned the invention is not limited to the use of members made from thermoplastic super-polyamides, although such material is particularly suitable in the present connection by reason of its being easily worked (by injection moulding) and its other convenient mechanical properties including its non-aging characteristic. Thus for example the use of members made from flowable metals (zinc, aluminum) is not excluded whereas the use of highly resilient materials such for example as rubber would not come within the purview of the invention since these materials do not flow but deform in a purely elastic manner. Rubber would also be unsuitable because of its unsatisfactory aging characteristic and for reasons of cost.

It may be mentioned that it would be a departure from the principle of the invention to subject connections such as illustrated in the drawing to a strong and continuous axial pull after the flow deformation has occurred, because in that case the material would flow in the axial direction over the ribs. Security against release of the parts connected to one another exists for the embodiments illustrated to the extent that automatic loosening of the connection, enabling the parts to be released, is impossible, with ample security against forces acting only for a short time in the direction in which relative movements are to be prevented.

The ribs may be produced by striking them up from the spindle or other metal part by means of a chisel-like tool (FIG. 7 shows a chisel 20 working on a metal part 21) so that they form a ridge with an adjacent channel, or they may be formed from moldable material integrally with the spindles 5 and 10. As regards the shape of these ribs it is always important to provide zones of very high specific surface pressure, which means that the term "rib" is not to be construed narrowly. On the assumption that a suitable configuration is imparted to the member of flowable material it is also possible to cause the said material to enter a channel or groove in the coacting member, which would be a case of kinematic reversal of the embodiments illustrated and which likewise comes within the scope of the present invention.

What is claimed is:

An assembly comprising an elongated metallic shaft formed with a plurality of axially extending grooves on its end portion so as to provide an extremity of non-circular cross-section, a rigid element to be mounted on said shaft, said element having an axially tapering bore in one end thereof slidably receiving said extremity with all-around clearance therebetween, a split tubular coupling member of deformable plastic material capable of cold flow disposed in said clearance and having an end portion spaced from the inner end of said bore and an axially tapered outer periphery in contact with the peripheral wall of said bore, said tubular coupling member having an inner periphery with at least one axially extending spline thereon interengaging with at least one of said grooves for preventing relative rotation between said coupling member and said shaft, said extremity being provided with at least one transverse rib at the bottom of another of said grooves, and screw means between the end of said coupling member and the end of said bore connecting said rigid element and said tubular coupling member for relative axial movement so as to draw said coupling member more deeply into said bore with exertion of a sustained radial pressure from the tapering peripheral wall thereof urging said rib into contact with an inner wall surface of said coupling member whereby said inner wall surface is creepingly deformed by said rib with consequent positive interlocking of said extremity and said coupling member.

References Cited by the Examiner

UNITED STATES PATENTS

| | | | |
|---|---|---|---|
| 2,305,099 | 12/1942 | Morris | 287—53 |
| 2,592,698 | 4/1952 | Hubbard | 287—85 X |
| 2,888,282 | 5/1959 | Naimer | 287—53 |
| 3,024,047 | 3/1962 | Schmohl. | |
| 3,047,319 | 7/1962 | Saylor | 287—90 |

FOREIGN PATENTS

| | | |
|---|---|---|
| 233,543 | 5/1961 | Australia. |
| 1,194,637 | 5/1959 | France. |
| 957,315 | 1/1957 | Germany. |
| 956,792 | 4/1964 | Great Britain. |

CARL W. TOMLIN, *Primary Examiner.*

A. V. KUNDRAT, *Assistant Examiner.*